United States Patent
Tomita et al.

(10) Patent No.: US 10,461,650 B2
(45) Date of Patent: Oct. 29, 2019

(54) CONTROL DEVICE FOR DC-DC CONVERTER

(71) Applicant: DENSO CORPORATION, Kariya, Aichi-pref. (JP)

(72) Inventors: Kenji Tomita, Nisshin (JP); Seiji Iyasu, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/292,709

(22) Filed: Mar. 5, 2019

(65) Prior Publication Data

US 2019/0280603 A1 Sep. 12, 2019

(30) Foreign Application Priority Data

Mar. 6, 2018 (JP) .................................. 2018-040053

(51) Int. Cl.
*H02M 3/335* (2006.01)
*H02M 1/08* (2006.01)

(52) U.S. Cl.
CPC ......... *H02M 3/33569* (2013.01); *H02M 1/08* (2013.01); *H02M 3/3353* (2013.01); *H02M 3/33523* (2013.01)

(58) Field of Classification Search
CPC ........... H02M 3/33523; H02M 3/3353; H02M 3/33569
USPC ............................ 363/17, 21.01, 78, 98, 165
See application file for complete search history.

(56) References Cited

U.S. PATENT DOCUMENTS

| 2005/0063201 | A1 | 3/2005 | Yamazaki |
| 2009/0102445 | A1 | 4/2009 | Ito et al. |
| 2014/0104890 | A1* | 4/2014 | Matsubara ........ H02M 3/33584 363/17 |
| 2014/0185334 | A1 | 7/2014 | Chen |
| 2014/0226368 | A1* | 8/2014 | Kimura ............. H02M 3/33507 363/21.09 |
| 2014/0307480 | A1* | 10/2014 | Hamamoto ......... H02M 3/3376 363/17 |

(Continued)

FOREIGN PATENT DOCUMENTS

| JP | 2006-060918 A | 3/2006 |
| JP | 2007-068349 A | 3/2007 |

(Continued)

*Primary Examiner* — Gary A Nash
(74) *Attorney, Agent, or Firm* — Oliff PLC (57) ABSTRACT

In a control device applied to an insulated DC-DC converter including a transformer and drive switches connected to a input winding of the transformer, the control device operates the drive switches to control an output voltage output via the output winding to a target voltage. Furthermore, the control device includes a voltage acquiring unit acquiring the output voltage and a frequency setting unit setting a switching frequency for the drive switches based on the output voltage acquired by the voltage acquiring unit. The frequency setting unit sets, for the switching frequency, a value increasing with a value of the acquired output voltage, and sets the switching frequency such that an increase in the value of the output voltage increases a frequency increase rate corresponding to an amount of increase in the switching frequency per unit amount of increase in the output voltage.

4 Claims, 8 Drawing Sheets

(56) References Cited

U.S. PATENT DOCUMENTS

| | | | | |
|---|---|---|---|---|
| 2014/0355313 | A1* | 12/2014 | Nishikawa | H02M 1/081 363/17 |
| 2015/0180356 | A1* | 6/2015 | Norisada | H02M 3/33546 363/17 |
| 2015/0333635 | A1* | 11/2015 | Yan | H02M 3/33507 363/17 |
| 2016/0094134 | A1* | 3/2016 | Iyasu | H02M 3/33515 363/17 |

FOREIGN PATENT DOCUMENTS

| JP | 2007-325335 A | 12/2007 |
|---|---|---|
| JP | 2010-252512 A | 11/2010 |

* cited by examiner

CONTROL DEVICE FOR DC-DC CONVERTER

CROSS-REFERENCE TO RELATED APPLICATION

This application is based on and claims the benefit of priority from earlier Japanese Patent Application No. 2018-40053 filed Mar. 6, 2018, the description of which is incorporated herein by reference.

BACKGROUND

Technical Field

The present disclosure relates to a control device applied to an insulated DC-DC converter including a transformer.

Related Art

A DC-DC converter including a transformer is subject to iron loss depending on the material, shape, or the like of a core.

There is a need for a control device for a DC-DC converter, which is capable of reducing iron loss occurring in a transformer of an insulated DC-DC converter.

SUMMARY

One aspect of the present disclosure provides a control device applied to an insulated DC-DC converter including a transformer including input winding and output winding magnetically coupled together via a core and drive switches connected to the input winding. The control device operates the drive switches to control an output voltage output via the output winding to a target voltage. Furthermore, the control device includes a voltage acquiring unit acquiring the output voltage and a frequency setting unit setting a switching frequency for the drive switches based on the output voltage acquired by the voltage acquiring unit. The frequency setting unit sets, for the switching frequency, a value increasing with a value of the acquired output voltage, and sets the switching frequency such that an increase in the value of the output voltage increases a frequency increase rate corresponding to an amount of increase in the switching frequency per unit amount of increase in the output voltage.

DESCRIPTION OF SPECIFIC EMBODIMENTS

First Embodiment

A DC-DC converter according to a first embodiment will be described. The DC-DC converter is mounted in a vehicle and reduces or increases a DC voltage supplied from a battery used as a DC power supply and supplies power to an apparatus used as a feeding target.

Figure 1:
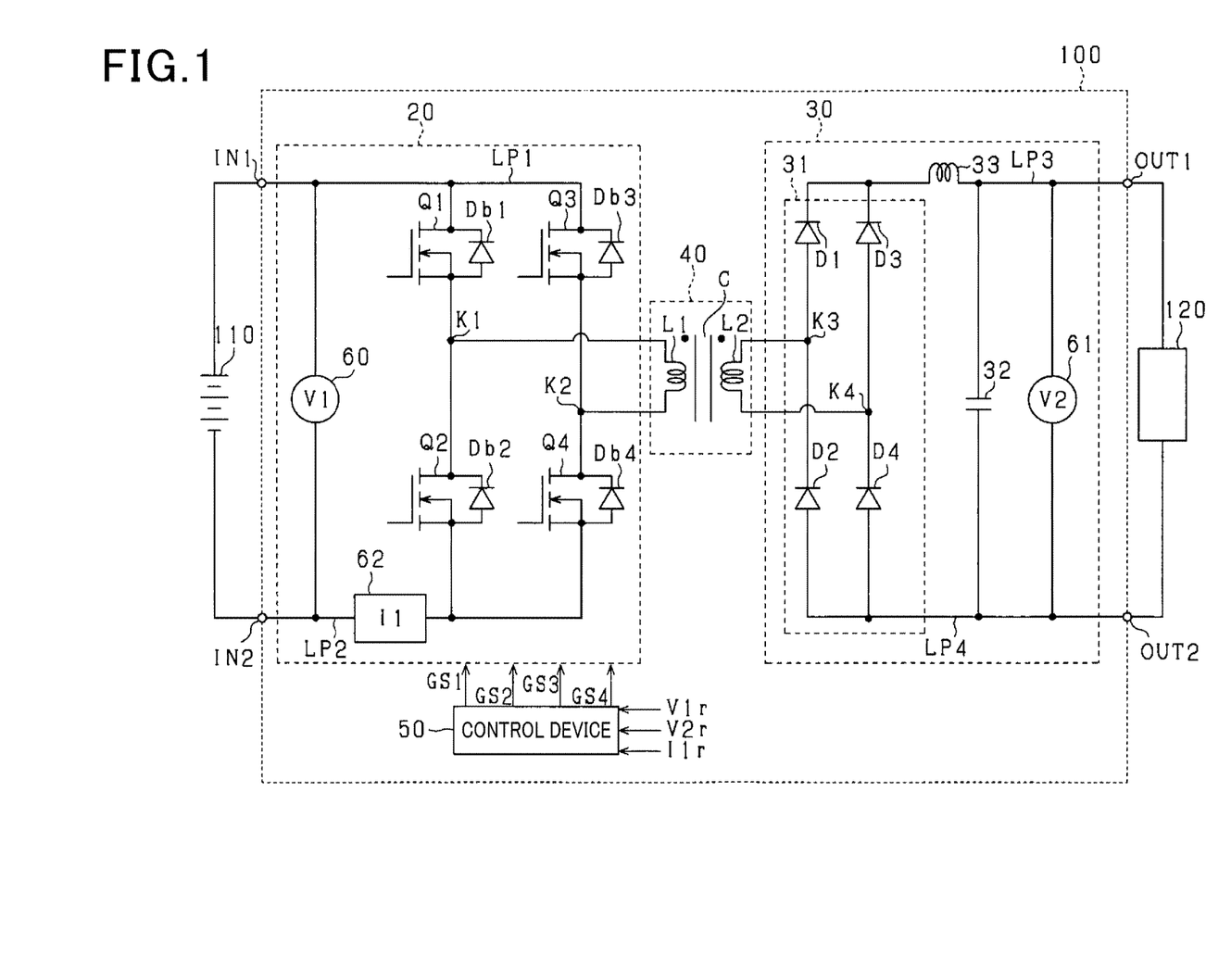
FIG. 1 is a diagram illustrating a configuration of a DC-DC converter according to a first embodiment.

FIG. 1 is a diagram of a configuration of a DC-DC converter 100 according to the present embodiment. The DC-DC converter 100 includes a first input terminal IN1 to which a cathode terminal of the battery 110 is connected and a second input terminal IN2 to which an anode terminal of the battery 110 is connected. Furthermore, the DC-DC converter 100 includes a first output terminal OUT1 to which a cathode terminal of an apparatus 120 is connected and a second output terminal OUT2 to which an anode terminal of the apparatus 120 is connected. The battery 110 is, for example, a battery pack including a plurality of battery cells connected together in series. The apparatus 120 includes at least one of a battery, an in-vehicle device, and an electric rotating machine.

The DC-DC converter 100 includes a primary circuit 20, a secondary circuit 30, and a transformer 40. The transformer 40 includes input winding L1, a core C, and output winding L2 magnetically coupled to the input winding L1 via the core C. Furthermore, the primary circuit 20 is connected to the input winding L1 of the transformer 40, and the secondary circuit 30 is connected to the output winding L2 of the transformer 40.

The primary circuit 20 is configured as a full bridge circuit including a first drive switch Q1, a second drive switch Q2, a third drive switch Q3, and a fourth drive switch Q4. In the present embodiment, the first to fourth drive switches Q1 to Q4 are n-channel MOSFETs. A source of the first drive switch Q1 is connected to a drain of the second drive switch Q2. A source of the third drive switch Q3 is connected to a drain of the fourth drive switch Q4. Furthermore, drains of the first drive switch Q1 and the third drive switch Q3 are connected to first wiring LP1. Sources of the second drive switch Q2 and the fourth drive switch Q4 are connected to second wiring LP2. The first wiring LP1 is connected to the first input terminal IN1. The second wiring LP2 is connected to the second input terminal IN2. Body diodes Db1 to Db4 are respectively connected in anti-parallel to the first to fourth drive switches Q1 to Q4.

A first end of the input winding L1 is connected to a first connection point K1 corresponding to a connection point between the source of the first drive switch Q1 and the drain of the second drive switch Q2. A second end of the input winding L1 is connected to a second connection point K2 corresponding to a connection point between the source of the third drive switch Q3 and the drain of the fourth drive switch Q4.

The secondary circuit 30 includes a diode bridge circuit 31 and a smoothing capacitor 32. In the diode bridge circuit 31, an anode of a first diode D1 is connected to a cathode of a second diode D2, and an anode of a third diode D3 is connected to a cathode of a fourth diode D4. Furthermore, cathodes of the first diode D1 and the third diode D3 are connected to third wiring LP3. Anodes of the second diode D2 and the fourth diode D4 are connected to fourth wiring LP4.

A first end of the output winding L2 is connected to a third connection point K3 corresponding to a connection point between the anode of the first diode D1 and the cathode of the second diode D2. A second end of the output winding L2 is connected to a fourth connection point K4 corresponding to a connection point between the anode of the third diode D3 and the cathode of the fourth diode D4.

The third wiring LP3 and the fourth wiring LP4 are connected together by the smoothing capacitor 32. On the third wiring LP3, a reactor 33 is connected in series between the diode bridge circuit 31 and the smoothing capacitor 32. The first output terminal OUT1 is connected to the third wiring LP3. The second output terminal OUT2 is connected to the fourth wiring LP4.

A first voltage sensor 60 is connected between the first wiring LP1 and the second wiring LP2. The first voltage sensor 60 detects an inter-terminal voltage of the battery 110 as an input voltage V1r. A second voltage sensor 61 is connected between the third wiring LP3 and the fourth wiring LP4. The second voltage sensor 61 detects an inter-terminal voltage of the smoothing capacitor 32 as an input voltage V2r.

On the second wiring LP2, a current sensor 62 is provided between the second input terminal IN2 and the second drive switch Q2. The current sensor 62 detects a current flowing through the primary circuit 20 as an input current I1r.

The DC-DC converter 100 includes a control device 50. The control device 50 includes a known microcomputer. In the present embodiment, in order to control the output voltage V2r to a target voltage V2*, the control device 50 generates operation signals GS1, GS2, GS3, GS4 respectively operating and setting the first to fourth drive switches Q1 to Q4 to an open state or a closed state. The first operation signal GS1 is a signal applied to a gate of the first drive switch Q1. The second operation signal GS2 is a signal applied to a gate of the second drive switch Q2. Furthermore, the third operation signal GS3 is a signal applied to a gate of the third drive switch Q3. The fourth operation signal GS4 is a signal applied to a gate of the fourth drive switch Q4.

Figure 2:
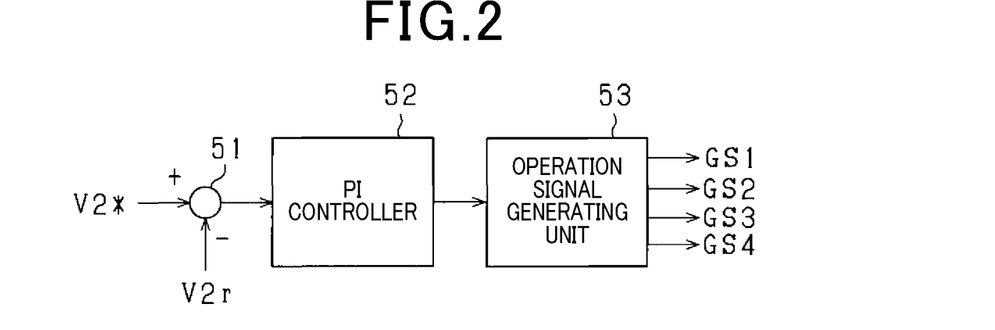
FIG. 2 is a functional block diagram of a control device.

FIG. 2 is a functional block diagram illustrating functions of the control device 50. The functions provided by the control device 50 can be provided, for example, by software recorded in a physical memory device, computer or hardware executing the software, or a combination of the software with the computer or hardware.

The output voltage V2r detected by the second voltage sensor 61 is input to a deviation calculator 51. The deviation calculator 51 subtracts the output voltage V2r from the target voltage V2* to calculate a voltage deviation and outputs the voltage deviation to a PI controller 52. The PI controller 52 sets a duty cycle Dr for the first to fourth drive switches Q1 to Q4 based on the input current I1r the voltage deviation output from the deviation calculator 51. The duty cycle Dr is a value indicative of a ratio (Ton/Tsw) of an on operation period Ton to one switching period Tsw in the first to fourth drive switches Q1 to Q4. The PI controller 52 sets the duty cycle Dr for the first to fourth drive switches Q1 to Q4 needed to control the output voltage V2r to the target voltage V2*.

A operation signal generating unit 53 generates the first to fourth operation signals GS1 to GS4. Specifically, the operation signal generates unit 53 generate the first to fourth operation signals GS1 to GS4 so as to set the duty cycle Dr for the first to fourth operation signals GS1 to GS4 to a value calculated by the PI controller 52 while providing a desired switching frequency fsw. The first to fourth operation signals GS1 to GS4 generated by the operation signal generating unit 53 are output to the gates of the first to fourth drive switches Q1 to Q4.

Operation of the DC-DC converter 100 will now be described. The DC-DC converter 100 is repeatedly controlled, by the first to fourth operation signals GS2 to GS4 output from the control device 50, to a first state where a positive polarity current flows through the input winding L1 of the transformer 40 and to a second state where a negative polarity current flows through the input winding L1. In the present embodiment, the positive polarity current refers to a current flowing though the input winding L1 in a direction from a first connection point K1 to a second connection point K2. Furthermore, the negative polarity current refers to a current flowing through the input winding L1 in a direction from the second connection point K2 to the first connection point K1.

In the first state, the first and fourth drive switches Q1 and Q4 are set to the closed state and the second and third drive switches Q2 and Q3 are set to the open state to flow a positive polarity current through the input winding L1. Thus, a current flows through the output winding L2 in a direction from a fourth connection point K4 to a third connection point K3. The current flowing out from the output winding L2 is rectified by the diode bridge circuit 31. The rectified current flows through the reactor 33 and the first output terminal OUT1 to the apparatus 120.

In the second state, the second and third drive switches Q2 and Q3 are set to the closed state and the first and fourth drive switches Q4 are set to the open state to flow a negative polarity current through the input winding L1. Thus, a current flows through the output winding L2 in a direction from the third connection point K3 to the fourth connection point K4. The current flowing out from the output winding L2 is rectified by the diode bridge circuit 31. The rectified current flows through the reactor 33 and the first output terminal OUT1 to the apparatus 120.

In the insulated DC-DC converter 100, iron loss Pi occurs that corresponds to the material, shape, or the like of the core C. The iron loss Pi is a factor reducing a power conversion efficiency (=Pout/Pin) corresponding to a ratio of output power Pout to input power Pin in the DC-DC converter 100. Here, the iron loss Pi is known to be proportional to the product of a exponentiated amount of change AB in a magnetic flux density of the transformer 40 during one switching period Tsw and an exponentiated switching frequency fsw. Thus, the iron loss Pi can be calculated by Equation (1).

$$Pi = \alpha \times \Delta B^a \times fsw^b \quad (1)$$

A coefficient for the iron loss Pi attributed to a hysteresis loss is denoted by a and specifically has a value of 2 or more. A coefficient for the iron loss Pi attributed to an eddy current loss is denoted by b and specifically has a value of 1 or more. The coefficients a and b are values determined by the material, shape, or the like of the core C, and have the relation "a>b". A constant is denoted by a.

Furthermore, the amount of change ΔB in magnetic flux density is calculated by Equation (2) below using the product of the input voltage V1r applied to the input winding L1 of the transformer 40 and the on operation period Ton indicative of the time for which the input voltage Vir is applied to the input winding L1. In Equation (2), N is the number of turns in the input winding L1 of the transformer 40, and S is the cross-sectional area [cm^2] of the core C.

$$\Delta B = (V1r \times Ton)/(N \times S) \quad (2)$$

The input voltage V1r and the output voltage V2r have the relation "V2r=V1r×Dr". The use of this relation and a relation of the duty cycle Dr "Dr=Ton/Tsw=Ton×fsw" allows Equation (3) to be calculated from Equation (2).

$$\Delta B = V2r/fsw \times \beta \quad (3)$$

In Equation (3), 13 is a constant expressed by "β=1/(N×S)".

The use of Equation (3) and Equation (1) allows the iron loss Pi to be calculated from Equation (4) below including the output voltage V2r and the switching frequency fsw as variables. In Equation (4), γ is a constant.

$$Pi = \gamma \times \frac{V2r^a}{fsw^{a-b}} \quad (4)$$

However, $\gamma = \alpha \times \beta^a$

On the right side of Equation (4), the numerator contains an exponentiated output voltage V2r, and thus the iron loss Pi increases exponentially with output voltage V2r. The value a is larger than the value b, and thus the effect of reducing the iron loss Pi may not be sufficiently achieved simply by increasing the switching frequency fsw in proportion to the output voltage V2r. Thus, the operation signal generating unit 53 sets the switching frequency fsw according to the manner of increasing the output voltage V2r to enable a suitable reduction in the iron loss Pi.

Figure 3:
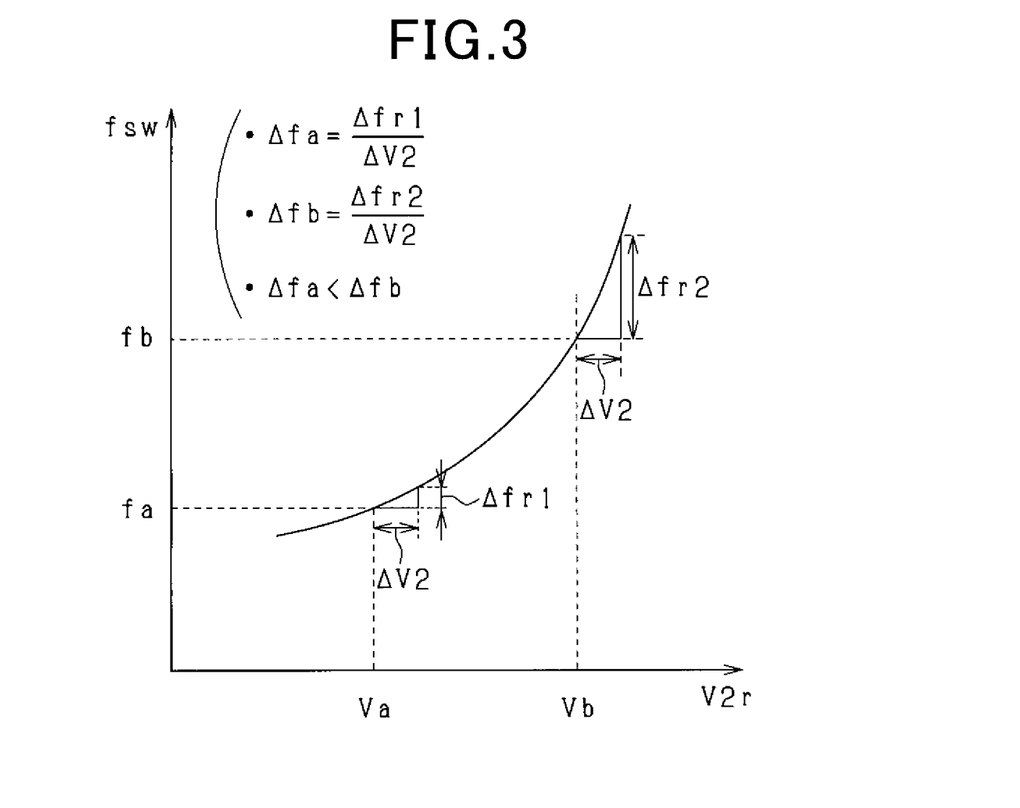
FIG. 3 is a diagram illustrating a relationship between an output voltage and a switching frequency.

Specifically, as illustrated in FIG. 3, the operation signal generating unit 53 sets, for the switching frequency fsw, a value increasing with a value of the output voltage V2r, and sets the switching frequency fsw such that an increase in the value of the output voltage V2r increases a frequency increase rate Δf corresponding to an amount of increase in the switching frequency fsw per unit amount of increase in the output voltage V2r.

FIG. 3 illustrates, by way of example, the manner in which the switching frequency fsw set by the operation signal generating unit 53 increases in a case where output voltages Va and Vb increase by a unit increase amount ΔV2. The output voltage Vb has a value higher than the output voltage Va. In a case where the output voltage Va increases by the unit increase amount ΔV2, the operation signal generating unit 53 increases a switching frequency fa by Δfr1. In a case where the output voltage Vb increases by the unit increase amount ΔV2, the operation signal generating unit 53 increases a switching frequency fb by Δfr2, which is larger than Δfr1. Thus, a frequency increase rate Δfb (=Δfr2/ΔV2) in a case where the output voltage Vb is increased by the unit increase rate ΔV2 is higher than a frequency increase rate Δfa (=Δfr1/ΔV2) in a case where the output voltage Va is increased by the unit increase rate ΔV2.

Accordingly, in Equation (4), the denominator can be increased in accordance with the manner of increasing the numerator with the output voltage V2r, enabling a suitable reduction in iron loss Pi.

Figure 4:
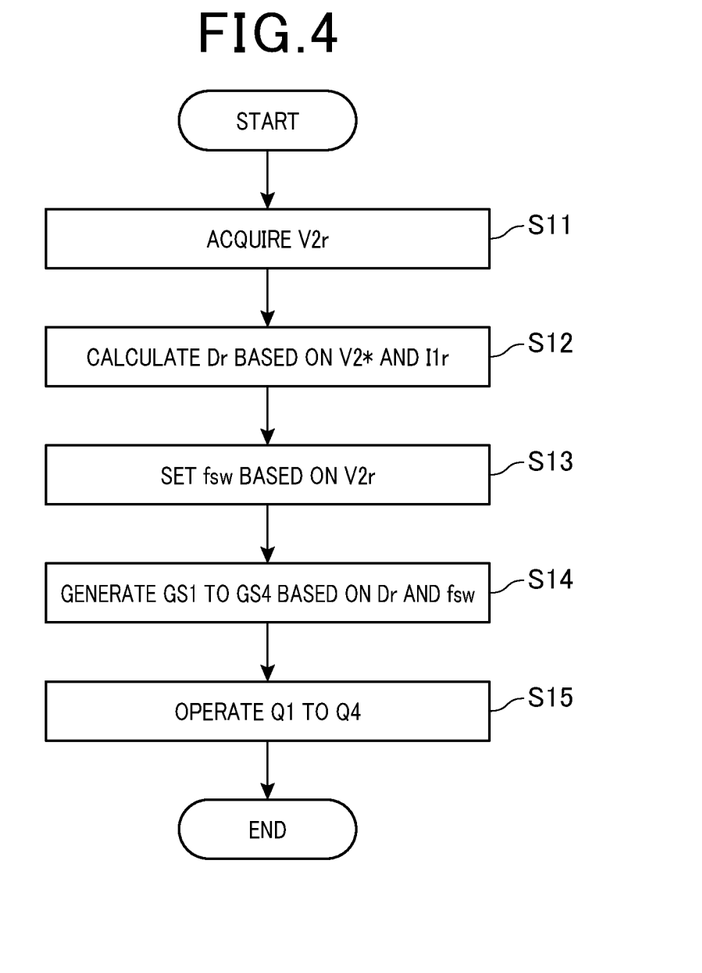
FIG. 4 is a flowchart illustrating an operational procedure for a first drive switch to a fourth drive switch.

An operational procedure for the first to fourth drive switches Q1 to Q4 in the present embodiment will now be described using FIG. 4. A process illustrated in FIG. 4 is repeatedly executed at predetermined intervals by the control device 50.

In step S11. the output voltage V2r detected by the second voltage sensor 61 is acquired. In the present embodiment, step S11 corresponds to a voltage acquiring unit.

In step S12, the duty cycle Dr for the first to fourth drive switches Q1 to Q4 is calculated based on the target voltage V2* and the input current I1r detected by the current sensor 62.

In step S13, the switching frequency fsw for the first to fourth drive switches Q1 to Q4 is set based on the output voltage V2r acquired in step S11. Specifically, the value set for the switching frequency fsw is increased with the value of the output voltage V2r, and the switching frequency fsw is set to increase the frequency increase rate Δf with the output voltage V2r.

A method for setting the switching frequency fsw may be, for example, as described below. Increasing the switching frequency fsw allows enhancement of the effect of reducing the iron loss Pi. However, in contrast, an excessively high switching frequency fsw may increase a switching loss. Thus, a frequency range is preset that is defined by an upper limit value and a lower limit value for the switching frequency fsw set in step S13. The switching frequency fsw is set to a value within this frequency range.

For example, the frequency range can be defined as follows. Equation (4) is modified into an equation for the switching frequency fsw, that is, Equation (5). Equation (5) can then be used to calculate a switching frequency Fs in a case where the iron loss Pi is assumed to have a target value, that is, a target iron loss value Tpi.

$$F_s = \left( \gamma \times \frac{V2r^a}{Tpi} \right)^{\left(\frac{1}{a-b}\right)} \quad (5)$$

Here, in Equation (5), the switching frequency fsw in the case where the iron loss Pi is assumed to have the target iron loss value Tpi is hereinafter referred to as a reference frequency Fs. The frequency range may be set as a range including, as an upper limit value, a switching frequency fsw that is a predetermined value higher than the reference frequency Fs at the target iron loss value Tpi, and as a lower limit value, a switching frequency fsw that is a predetermined value lower than the reference frequency Fs at the target iron loss value Tpi.

In step S13, it is sufficient that the switching frequency fsw is set with reference to the switching frequency fsw corresponding to the output voltage V2r based on table information specifying a relationship between the output voltage V2r and the switching frequency fsw. Also in this case, the switching frequency fsw held in the table may be set to a value within the above-described frequency range.

In step S14, the first to fourth operation signals GS1 to GS4 are generated based on the duty cycle Dr calculated in step S12 and the switching frequency fsw set in step S13. Step S13 and step S14 correspond to a frequency setting unit.

In step S15, the first to fourth operation signals GS1 to GS4 generated in step S14 are used to operate and set the first to fourth drive switches Q1 to Q4 to the open or closed state. Thus, the first to fourth drive switches Q1 to Q4 are each operated at the switching frequency fsw suitable for reducing the iron loss Pi.

Once the process in step S15 ends, the process in FIG. 4 is temporarily ended.

Advantageous effects of the present embodiment will now be described.

A non-insulated DC-DC converter that changes a switching frequency for drive switches is known. This type of DC-DC converter lowers the switching frequency to reduce a switching loss in a case of a decrease in load or output voltage.

A DC-DC converter including a transformer is subject to iron loss depending on the material, shape, or the like of a core. There is a need for a control device for a DC-DC converter, the control device being capable of reducing iron loss occurring in a transformer of an insulated DC-DC converter.

The amount of change in magnetic flux density used to calculate the iron loss increases with the product of an input voltage applied to the input winding of the transformer and an on operation period of the drive switches indicating a time for which the input voltage is applied to the input winding. Furthermore, the product of the input voltage and the on operation period can be calculated using the output voltage output via the output winding of the transformer and the switching frequency for the drive switches. As a result, the iron loss increases with a value obtained by dividing a value of an exponentiated output voltage by a value of an exponentiated switching frequency. This leads to a relationship in which the iron loss increases with the output voltage while decreasing with increasing switching frequency. Looking at this relationship, the present inventor has found that the iron loss can be suitably reduced by increasing the switching frequency according to a manner of increasing the output voltage.

Thus, in an aspect of the present disclosure, when the drive switches are operated to control the output voltage to a target voltage, a value set for the switching frequency increases with a value of the output voltage, and the switching frequency is set to increase the frequency increase rate with the value of the output voltage. This allows setting of a switching frequency suitable for suppressing an increase in iron loss according to the output voltage. This enables a reduction in the iron loss in the transformer of the insulated DC-DC converter.

Figure 5:
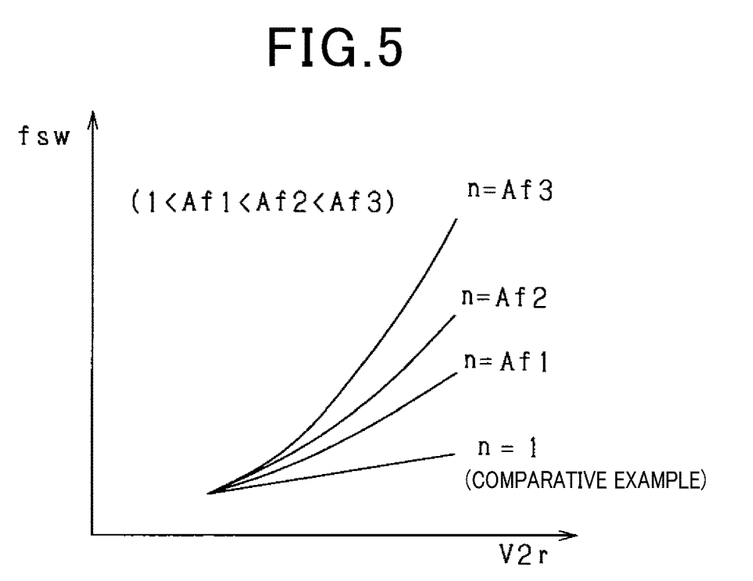
FIG. 5 is a diagram illustrating a switching frequency set based on the output voltage.
Figure 6:
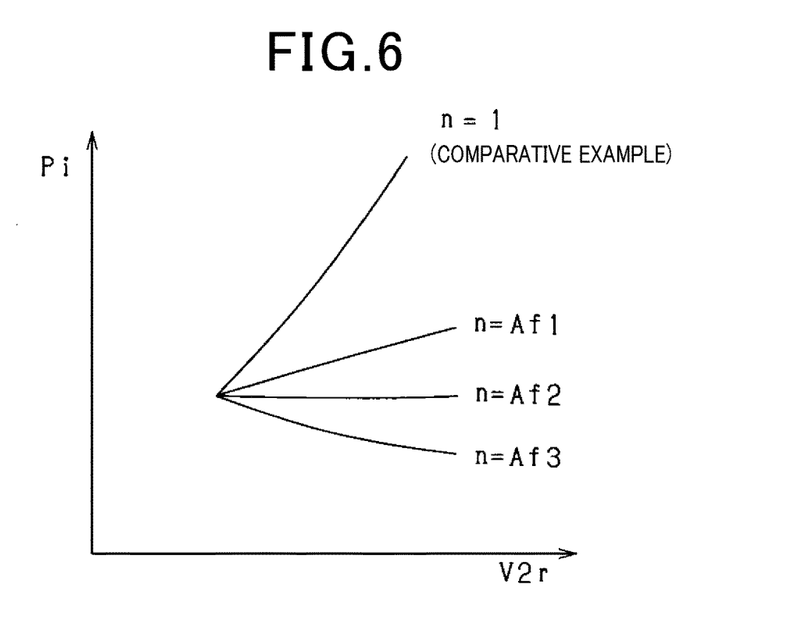
FIG. 6 is a diagram illustrating changes of iron loss in a case where the switching frequency is increased with the output voltage at each frequency increase rate.

FIG. 5 illustrates the switching frequency fsw set based on the output voltage V2r. The abscissa axis indicates the output voltage V2r, and the ordinate axis indicates the switching frequency fsw. FIG. 5 illustrates changes of the switching frequency fsw set according to the output voltage V2r. In a case where the switching frequency fsw is set in proportion to nth power of the output voltage V2r, FIG. 5 illustrates the switching frequency fsw obtained when n is set to Af1, Af2, or Af3 (1<Af1<Af2<Af3). Af1, Af2, and Af3 are values set in the present embodiment. FIG. 5 illustrates the switching frequency fsw for n=1 as a comparative example. Furthermore, FIG. 6 illustrates changes of the iron loss Pi corresponding to each of the manners of changing the switching frequency fsw illustrated in FIG. 5.

In FIG. 5, in the comparative example, the switching frequency fsw increases at a constant frequency increase rate Δf with the output voltage V2r. Furthermore, in FIG. 6, a gradient indicative of an increasing tendency of the iron loss Pi in the comparative example is larger than a gradient of the switching frequency fsw for n=Af1, Af2, or Af3. Thus, the iron loss Pi in the comparative example is larger than the iron loss Pi in the present embodiment at all the output voltages V2r from low voltages to high voltages.

In FIG. 5, in the present embodiment (Af1, Af2, and Af3), the frequency increase rate Δf of the switching frequency fsw increases with the output voltage V2r. Furthermore, in FIG. 6, the gradient indicative of the increasing tendency of the iron loss Pi is smaller in the present embodiment than in the comparative example. Specifically, the gradient decreases with increasing value n. Thus, the iron loss Pi in the present embodiment is smaller than the iron loss Pi in the comparative example at all the output voltages V2r from low voltages to high voltages. This indicates that the iron loss Pi has been suitably reduced in the present embodiment.

The control device 50 sets, according to the output voltage V2r, a switching frequency fsw suitable for suppressing an increase in iron loss Pi. At this time, a switching frequency fsw is set that is higher than the switching frequency fsw specified for n=1 (see FIG. 5). This enables a reduction in the iron loss Pi occurring in the transformer 40, thus allowing suppression of a decrease in the power conversion efficiency of the DC-DC converter 100.

Modified Example 1 of First Embodiment

In Modified Example 1 of the first embodiment, components differing from the components of the first embodiment will mainly be described.

Figure 7:
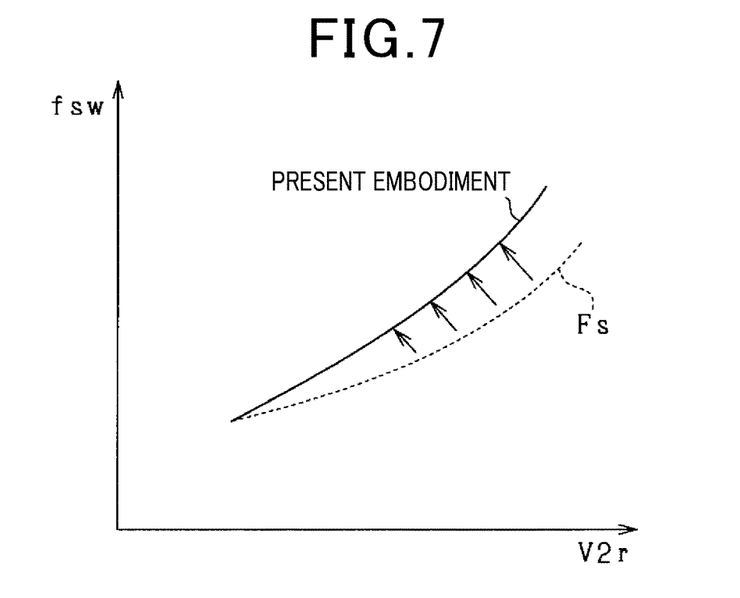
FIG. 7 is a diagram illustrating a switching frequency set based on the output voltage using the control device according to a modified example of the first embodiment.
Figure 8:
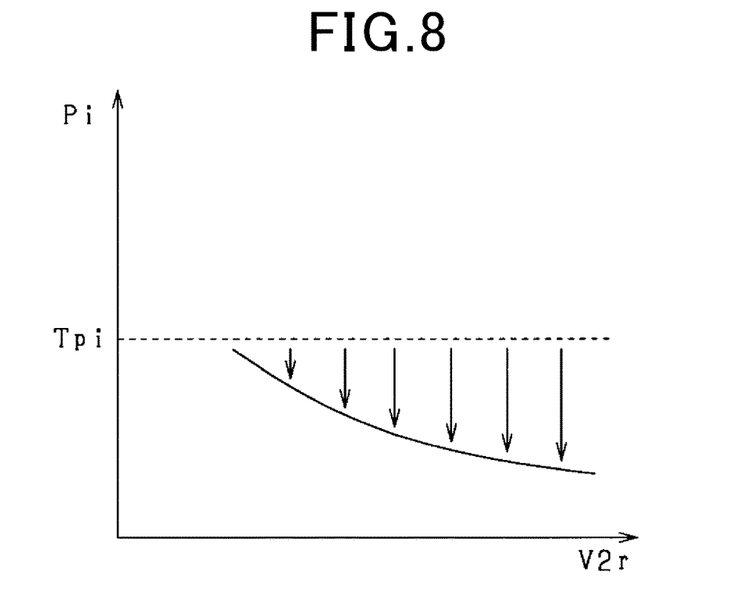
FIG. 8 is a diagram illustrating changes of iron loss in a case where the switching frequency is increased with the output voltage at each frequency increase rate.

FIG. 7 illustrates the switching frequency fsw set based on the output voltage V2r. The abscissa axis indicates the output voltage V2r, and the ordinate axis indicates the switching frequency fsw. In FIG. 7, a dashed line represents changes of the reference frequency Fs and a solid line represents changes of the switching frequency fsw in the present embodiment in a case where the target value of the iron loss Pi is assumed to be the target iron loss value Tpi. FIG. 8 illustrates changes of the iron loss Pi in accordance with the changes of the switching frequency fsw illustrated in FIG. 7. The abscissa axis indicates the output voltage V2r, and the ordinate axis indicates the iron loss Pi.

In the present embodiment, the frequency increase rate Δf of the switching frequency fsw set by the control device 50 is set to such a value as reduces the iron loss Pi with increasing output voltage V2r.

Specifically, as illustrated in FIG. 7, the frequency increase rate Δf is set to a value higher than the frequency increase rate Δf of the reference frequency Fs all over the range of the output voltage V2r of the DC-DC converter 100. Also in the present embodiment, the value set for the switching frequency fsw increases with the value of the output voltage V2r, and the switching frequency fsw is set to increase the frequency increase rate Δf with the value of the output voltage V2r.

The frequency increase rate Δf of the switching frequency fsw is set to a value higher than the frequency increase rate Δf of the reference frequency Fs. This enables the iron loss Pi to be reduced below the target iron loss value Tpi, and also allows the iron loss Pi to be reduced with increasing output voltage V2r, as illustrated in FIG. 8.

In a case where, in step S13, the switching frequency fsw is set with reference to the table information specifying the relationship between the output voltage V2r and the switching frequency fsw, the table information may be created as follows. The frequency increase rate Δf of the reference frequency Fs is calculated in accordance with the target iron loss value Tpi, used as the target value. The switching frequency fsw to be associated with the output voltage V2r is set to make the corresponding frequency increase rate Δf higher than the frequency increase rate Δf of the reference frequency Fs. The resultant switching frequency fsw is stored in the storage unit of the control device 50 as table information.

The present embodiment described above can further enhance the effect of reducing the iron loss Pi.

Modified Example 2 of First Embodiment

The frequency increase rate Δf of the switching frequency fsw may be set to such a value as makes the iron loss Pi of the core C constant. In this case, it is sufficient that the reference frequency Fs corresponding to the target iron loss value Tpi, used as the target value, is calculated and that information including the calculated reference frequency Fs in association with the output voltage V2r is be stored in the storage unit as table information. Also in the present modified example, it is sufficient that the reference frequency Fs is set to a value increasing with the value of the output voltage V2r and that the reference frequency Fs is set to increase the frequency increase rate Δf with the output voltage V2r.

Second Embodiment

In a second embodiment, components differing from the components of the first embodiment will mainly be described. In the second embodiment, the same components as the corresponding components of the first embodiment are denoted by the same reference numerals and will not be repeatedly described.

Figure 9:
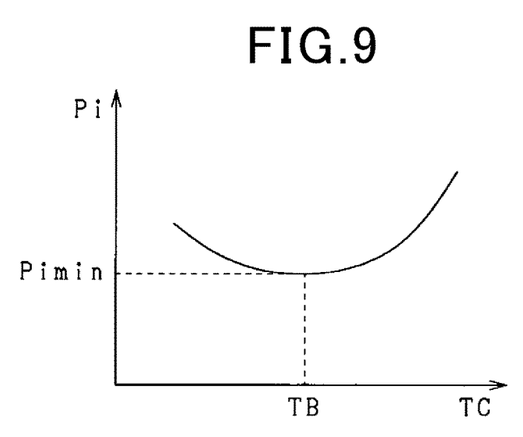
FIG. 9 is a diagram illustrating a relationship between a core temperature and iron loss according to a second embodiment.

The transformer 40 has a reference temperature TB at which the iron loss Pi has a predetermined value or smaller and which corresponds to the material, shape, or the like of the core C. FIG. 9 is a diagram illustrating a relationship between a core temperature TC indicative of the temperature of the core C by way of example and the iron loss Pi. The abscissa axis indicates the core temperature TC, and the ordinate axis indicates the iron loss Pi. In FIG. 9, the iron loss Pi changes in such a manner as to protrude downward with respect to the core temperature TC. Specifically, the iron loss Pi has a minimum value Pmin at the reference temperature TB within a range defined by a minimum temperature and a maximum temperature each assumed for the core temperature TC.

FIG. 9 indicates that making the core temperature TC closer to the reference temperature TB allows the iron loss Pi to be set to a predetermined value or smaller. Thus, in the present embodiment, the control device 50 corrects, based on the core temperature TC, the switching frequency fsw set based on the output voltage V2r. This further enhances the effect of reducing the iron loss Pi.

Figure 10:
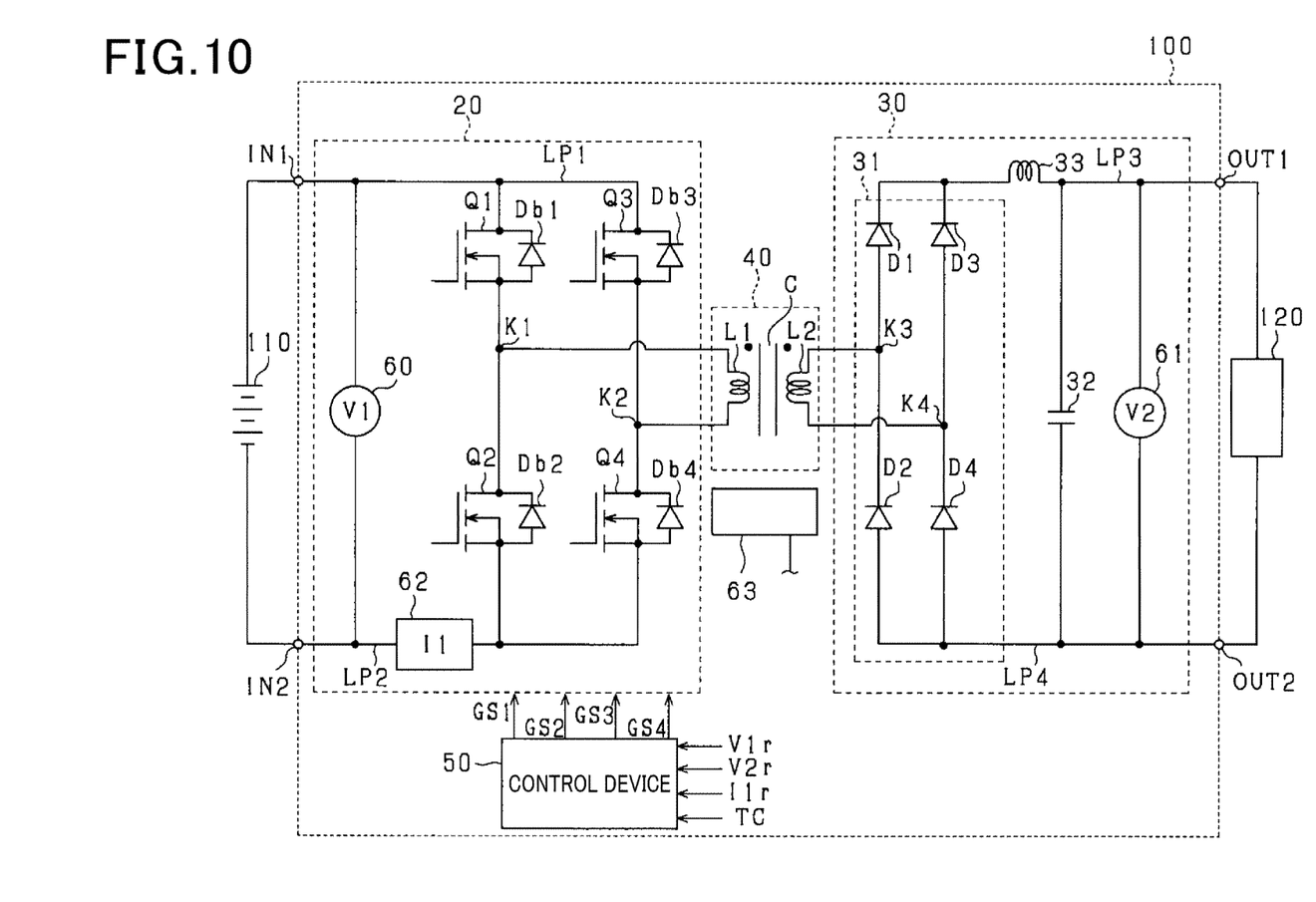
FIG. 10 is a diagram of a configuration of a DC-DC converter.

FIG. 10 is a diagram of a configuration of the DC-DC converter 100 according to the second embodiment. In the present embodiment, a temperature sensor 63 is provided around the core C of the transformer 40 to detect the temperature of the core C as the core temperature TC. The core temperature TC detected by the temperature sensor 63 is output to the control device 50.

Figure 11:
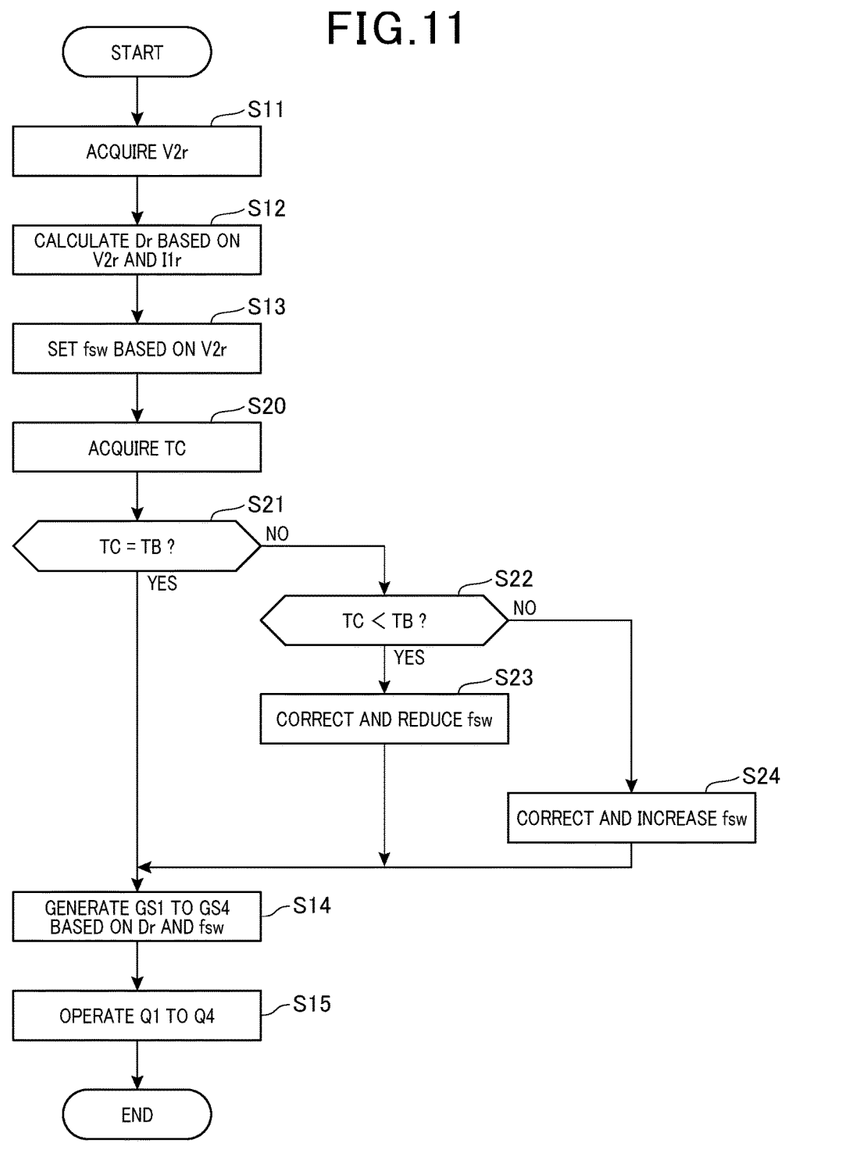
FIG. 11 is a flowchart illustrating a procedure of operation of the first to fourth drive switches.

A procedure of operation of the first to fourth drive switches Q1 to Q4 in the present embodiment will now be described using FIG. 11. A process illustrated in FIG. 11 is repeatedly executed at predetermined intervals by the control device 50.

In step S13, when the switching frequency fsw is set based on the output voltage V2r, the process proceeds to step S20. In step S20, the core temperature TC detected by the temperature sensor 63 is acquired. Step S20 corresponds to a temperature acquiring unit.

In step S21, the control device 50 determines whether or not the core temperature TC acquired in step S20 is the reference temperature TB determined by the material, shape, or the like of the core C.

When the core temperature TC is determined to be the reference temperature TB, the process proceeds to step S14 to generate the first to fourth operation signals GS1 to GS4. In other words, when the core temperature TC is determined to be the reference temperature TB, correction for making the core temperature TC closer to the reference temperature TB is not executed.

On the other hand, when the core temperature TC is determined not to be the reference temperature TB, the process proceeds to step S22. In step S22, whether or not the core temperature TC is lower than the reference temperature TB is determined. When the core temperature TC is determined to be lower than the reference temperature TB, the process proceeds to step S23. Step S21 and step S22 correspond to a temperature determining unit.

In step S23, the switching frequency fsw for the first to fourth operation signals GS1 to GS4 is corrected to a value lower than the value set in step 13 to make the core temperature TC closer to the reference temperature TB. The switching frequency fsw is set lower than the value set in step S13 to allow the core temperature TC to be increased.

In a case where the core temperature TC is higher than the reference temperature TB, the process proceeds to step S24. In step S24, the switching frequency fsw for the first to fourth operation signals GS1 to GS4 is corrected to a value higher than the value set in step 13 to make the core temperature TC closer to the reference temperature TB. The switching frequency fsw is set higher than the value set in step S13 to enable a reduction in the iron loss Pi of the transformer 40 and thus in the core temperature TC. Steps S23 and S24 correspond to a frequency correcting unit.

The process proceeds to step S14 to generate the first to fourth operation signals GS1 to GS4 based on the duty cycle Dr and the corrected switching frequency fsw. In step S15, the first to fourth drive switches Q1 to Q4 are operated using the first to fourth operation signals GS1 to GS4. Thus, the first to fourth drive switches Q1 to Q4 are operated at the switching frequency fsw suitable for reducing the iron loss Pi.

The present embodiment described above produces the following effects.

In a case of operating the first to fourth drive switches Q1 to Q4 based on the set switching frequency fsw, the control device 50 determines whether or not the core temperature TC is the reference temperature TB. When determining the core temperature TC not to be the reference temperature TB, the control device 50 corrects the set switching frequency fsw to set the core temperature TC equal to the reference temperature TB. In this case, in addition to the output voltage V2r, the core temperature TC is involved in the setting of the switching frequency fsw. This allows further enhancement of the effect of reducing the iron loss Pi.

Modified Example of Second Embodiment

The reference temperature TB may be set to a value within a temperature range with a predetermined width. In this case, in step S21 in FIG. 11, the control device 50 determines whether or not the core temperature TC is included in the predetermined temperature range. When the core temperature TC is determined not to be included in the temperature range, the control device 50 determines, in step S22, whether or not the core temperature TC is lower than the lower limit value of the temperature range. When the core temperature TC is determined to be lower than the lower limit value of the temperature range, in step S23, the switching frequency fsw is corrected to a value lower than the value set in step S13. On the other hand, in a case where the process proceeds to step S24, the core temperature TC is higher than the upper limit value of the temperature range. Thus, the switching frequency fsw is corrected to a value higher than the value set in step S13.

The above-described modified example of the second embodiment produces effects similar to the effects of the second embodiment.

Modifications

The output voltage used to set the switching frequency fsw is not limited to the detected value V2r of the output voltage but may be the target voltage V2*. In this case, in step S13, the switching frequency fsw is set based on the target voltage V2*.

The control device 50 may perform peak current mode control based on the input current Iir. In this case, in step S12, the duty cycle Dr is set to prevent the input current I1r from increasing above a current command value.

The secondary circuit 30 may include a synchronous rectification circuit instead of the diode bridge circuit 31.

What is claimed is:

1. A control device applied to a DC-DC converter including a transformer including input winding and output winding magnetically coupled together via a core and drive switches connected to the input winding, the control device operating the drive switches to control an output voltage output via the output winding to a target voltage, the control device comprising:
    a voltage acquiring unit acquiring the output voltage; and
    a frequency setting unit setting a switching frequency for the drive switches based on the output voltage acquired by the voltage acquiring unit, wherein
    the frequency setting unit sets, for the switching frequency, a value increasing with a value of the output voltage, and sets the switching frequency such that an increase in the value of the output voltage increases a frequency increase rate corresponding to an amount of increase in the switching frequency per unit amount of increase in the output voltage.

2. The control device for the DC-DC converter according to claim 1, wherein the frequency increase rate is set to such a value as makes iron loss of the core constant or as reduces the iron loss of the core with an increase in the output voltage.

3. The control device for the DC-DC converter according to claim 1, comprising:
    a temperature acquiring unit acquiring a core temperature corresponding to a temperature of the core;
    a temperature determining unit determining whether or not the core temperature is a reference temperature at which the iron loss of the core has a value lower than a predetermined value in a case where the drive switches are operated based on the switching frequency set by the frequency setting unit; and
    a frequency correcting unit correcting the switching frequency set by the frequency determining unit to set the core temperature equal to the reference temperature in a case where the temperature determining unit determines the core temperature not to be the reference temperature.

4. The control device for the DC-DC converter according to claim 3, wherein, in a case where the core temperature is determined not to be the reference temperature, the frequency correcting unit corrects the switching frequency to increase the switching frequency above the switching frequency set by the frequency setting unit to make the core temperature closer to the reference temperature in a case where the core temperature is higher than the reference temperature, and the frequency correcting unit corrects the switching frequency to reduce the switching frequency below the switching frequency set by the frequency setting unit to make the core temperature closer to the reference temperature in a case where the core temperature is lower than the reference temperature.

* * * * *